(12) United States Patent
Takano et al.

(10) Patent No.: US 7,873,113 B2
(45) Date of Patent: Jan. 18, 2011

(54) RADIO COMMUNICATION METHOD, TRANSMITTER, AND RECEIVER

(75) Inventors: Takeshi Takano, Kawasaki (JP); Liang Zhou, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 732 days.

(21) Appl. No.: 11/889,544

(22) Filed: Aug. 14, 2007

(65) Prior Publication Data

US 2007/0281746 A1    Dec. 6, 2007

(30) Foreign Application Priority Data

Oct. 4, 2006    (JP) .............................. 2006-273018

(51) Int. Cl.
H04L 1/02    (2006.01)

(52) U.S. Cl. .................................... 375/267

(58) Field of Classification Search ................ 375/267, 375/299, 347, 349; 700/53; 455/101, 132–141
See application file for complete search history.

(56) References Cited

U.S. PATENT DOCUMENTS

| 2005/0128983 | A1 | 6/2005 | Kim et al. | |
| 2005/0233710 | A1* | 10/2005 | Lakkis et al. | 455/102 |
| 2007/0058577 | A1* | 3/2007 | Rubin | 370/328 |
| 2007/0066332 | A1* | 3/2007 | Zhang et al. | 455/513 |

FOREIGN PATENT DOCUMENTS

| EP | 1643661 | 4/2006 |
| JP | 2004312381 | 11/2004 |
| JP | 2006067237 | 3/2006 |
| WO | WO 2005/034387 | 4/2005 |

OTHER PUBLICATIONS

S. Sanayei et al., "Capacity Maximizing Algorithms for Joint Transmit-Receive Antenna Selection", Signals, Systems and Computers, 2004. IEEE, vol. 2, Nov. 7, 2004, pp. 1773-1776.
K. Jung, et al., "Bit and Power Allocation for MIMO-OFDM Systems with Spatial Mode Selection over Frequency-Space-Time Selective Channels", Vehicular Technology Conference, 2004. IEEE, vol. 5, Sep. 26, 2004, pp. 3404-3408.
European Search Report mailed May 9, 2008 for corresponding European Patent Application No. 07114250.9.
"Chinese Office Action", mailed by Chinese Patent Office and corresponding to Chinese application No. 200710149266.2 on Aug. 12, 2010.

* cited by examiner

Primary Examiner—Sam K Ahn
(74) Attorney, Agent, or Firm—Fujitsu Patent Center

(57) ABSTRACT

Of the antenna group composed of multiple ones of the transmission antennas and multiple ones of the reception antennas, the present method selects an antenna group which satisfies a first criterion relating to communication quality. Out of combinations of transmission antennas and reception antennas included in the selected antenna group, combinations which satisfy a second criterion relating to communication quality are selected. Using a part of or all of the selected combinations of transmission antennas and reception antennas, the above-mentioned communication is performed. As a result, selection of optimal transmission antennas and reception antennas according to radio communication environment can be performed with high speed with a smaller amount of operation amount than the previous art.

18 Claims, 7 Drawing Sheets

RADIO COMMUNICATION METHOD, TRANSMITTER, AND RECEIVER

CROSS REFERENCE TO RELATED APPLICATION(S)

This application is based on and hereby claims priority to Japanese Application No. 2006-273018 filed on Oct. 4, 2006 in Japan, the contents of which are hereby incorporated by reference.

BACKGROUND OF THE INVENTION (1) Field of the Invention

The present invention relates to a radio communication method, a transmitter, and a receiver. For example, the present invention relates to an art suitable for use in selecting transmission antennas and reception antennas in a radio communication system using MIMO (Multiple Input Multiple Output).

(2) Description of the Related Art

Recently, MIMO (Multiple-Input Multiple-Output) becomes a focus of attention as an art which makes possible a great amount (high speed) of data communication effectively using frequency bands. MIMO is an art for improving the transmission rate, without necessity of enlarging frequency bands, by means of using multiple antennas both in transmission and reception. That is, using a transmitter and a receiver with multiple antennas, independent data streams are transmitted from the multiple antennas of the transmitter. From the signal received by each reception antenna of the receiver, multiple transmission signals (data streams) that are mixed on the propagation path are individually separated by use of channel state information (CSI; also called channel estimation value) representing the state (environment) of the channel.

In MIMO communication system, normally, the Base Station (BS) employs antennas greater in number than that of the mobile station (MS). In addition, depending upon a state, for securing transfer quality, etc., the BS and the MS communicates each other via a relay station (RS).

In the previous MIMO system (see the following patent document 1), to ensure a transfer capacity, the reception antennas of the BS is grouped, and the BS uses an antenna group selected on the basis of a certain criterion for reception.

Further, in the art of the following patent document 2, since the number of transmission antennas of the BS is as small as four, transmission antenna selection can be performed with a calculation amount to a degree.

[Patent Document 1] Japanese Patent Application Laid-Open No. 2004-312381

[Patent Document 2] Japanese Patent Application Laid-Open No. 2006-67237

However, according to the previous art (the art of the patent document 1), an art is only disclosed in which the BS selects reception antennas, and nothing is disclosed there about selecting transmission antennas of the BS.

In addition, according to the art of the patent document 2, a greater number of antennas of the BS will result in a significantly long time of searching the optimal antenna.

Further, since the number of transmission antennas used (selected) in the BS (transmitter) end is normally equal to the number of reception antennas used in the MS (receiver) end (for example, 2 transmission antennas in the BS end and 2 reception antennas in the MS end; 2×2 MIMO). Thus, the condition of antennas is sometimes not good depending upon communication environment, and it is difficult to ensure robust transfer capacity.

In addition, in a case where the number of antennas of the RS is large, if all the antennas of the BS end and of the RS end are used at the same time, costs and complexity are increased. Further, when antenna selection is performed between the BS and the RS, it takes a significant length of time to look for the optimum antennas because of the great of number of antennas.

SUMMARY OF THE INVENTION

With the foregoing problems in view, it is an object of the present invention to make it possible to select the optimal transmission antennas and reception antennas in accordance with radio environment with high speed with a smaller amount of operation than the previous art.

Further, as a spillover effect, MIMO communication and precoding transmission (beam forming) can be selectively performed, thereby making possible ensuring transfer capacity maintaining reliability of communication and communication quality such as a wave reachable range.

In order to accomplish the above object, according to the present invention, the following radio communication method, a transmitter, and a receiver are provided.

(1) As a generic feature, there is provided a radio communication method for use in a radio communication system in which radio communication is performed between a transmitter having a plurality of transmission antennas and a receiver having a plurality of reception antennas, the method comprising: selecting an antenna group which satisfies a first selection criterion relating to communication quality, out of a plurality of antenna groups, each of which is composed of some of the transmission antennas and some of the reception antennas; selecting a combination which satisfies a second criterion relating to communication quality, out of combinations of the transmission antennas and the reception antennas which are included in the selected antenna group; and performing communication using a part of or all of the selected combinations of the transmission antennas and the reception antennas.

(2) As a preferred feature, transmission antennas included in the antenna group are multiple adjacent transmission antennas or multiple transmission antennas which are disposed at an equal distance from a reference transmission antenna.

(3) As another preferred feature, a part of transmission antennas included in an antenna group are included in another antenna group.

(4) As yet another preferred feature, the number of transmission antennas included in the antenna group is larger than the number of reception antennas included in the antenna group.

(5) As a further preferred feature, the radio communication method further comprises: evaluating whether or not any combination, out of the combinations, exists which satisfies a criterion relating to MIMO communication in which the number of reception antennas is equal to the number of transmission antennas; performing, if it is evaluated that such a combination exits, MIMO communication using the combination of transmission antennas; and performing, if it is evaluated that such a combination does not exist, precoding transmission using all of the transmission antennas included in the combination.

(6) As a still further preferred feature, a part of or all of the reception antennas included in an antenna group are included in another antenna group.

(7) As a further feature, the receiver notifies the transmitter of information about the selected combinations of transmission antennas and reception antennas.

(8) As another generic feature, there is provided a radio communication method for use in a radio communication system in which radio communication is performed between a transmitter having $N_t$-number ($N_t$ is an integer greater than 1) of transmission antennas and a receiver having $N_r$-number ($N_r$ is an integer greater than 1) of reception antennas, the method comprising: grouping ($N_r \times N_t$)-number of channel estimation values, which are obtained between the transmission antennas and the reception antennas, into a plurality of blocks including ($L_r \times L_t$)-number ($L_t < N_t$, $L_r$) of element estimation values; selecting a block which satisfies a first selection criterion relating to communication quality, out of the plurality of blocks; selecting a combination which satisfies a second criterion relating to communication quality, out of combinations of element estimation values which are included in the selected block; performing communication using a part of or all of the combinations of the transmission antennas and the reception antennas corresponding to the selected combination of element estimation values.

(9) As yet another generic feature, there is provided a receiver for use in a radio communication system in which radio communication is performed between a transmitter having $N_t$-number ($N_t$ is an integer greater than 1) of transmission antennas and a receiver having $N_r$-number ($N_r$ is an integer greater than 1) of reception antennas, the receiver comprising: a grouping means which groups ($N_r \times N_t$)-number of channel estimation values, which are obtained between the transmission antennas and the reception antennas, into a plurality of blocks including ($L_r \times L_t$) -number ($L_t < N_t$, $L_r \leq N_r$) of element estimation values; a block selecting means which selects a block that satisfies a first selection criterion relating to communication quality, out of the plurality of blocks obtained by the grouping means; an element estimation value selecting means which selects a combination which satisfies a second criterion relating to communication quality, out of combinations of element estimation values which are included in the block selected by the block selecting means; a notifying means which generates antenna selection information for the transmitter on the basis of selection result obtained by the block selecting means or the element estimation value selecting means and notifies the transmitter of the generated antenna selection information.

(10) As a further generic feature, there is provided a transmitter for use in a radio communication system in which radio communication is performed between a transmitter having $N_t$-number ($N_t$ is an integer greater than 1) of transmission antennas and a receiver as set forth in the above item (9), the transmitter comprising: a receiving means which receives the antenna selection information from the notifying means; and an antenna selecting means which selects transmission antenna to be used according to the antenna selection information received by the receiving means.

According to the above-described invention, at least either of the effects and benefits described below is obtained.

(1) Even if the number of transmission and reception antennas is significantly large due to a great number of transmission antennas (that is, the number of element estimation values of the channel matrix becomes significantly large), it is possible to select the optimal transmission antennas and reception antennas in accordance with radio environment with higher speed with a smaller amount of operation amount than the previous art, thereby realizing the optimal communication according to the radio environment. In addition, costs and complexity can also be reduced.

(2) If a combination satisfying the predetermined (the above-described first and second) antenna selection criteria exists, MIMO communication is performed using such a combination of transmission and reception antennas. On the other hand, if no combination (satisfying the above-mentioned second antenna selection criterion) of transmission and reception antennas suitable for MIMO communication exists, precoding transmission (beam forming) is performed. Thus, in whatever radio environment, it is always possible to ensure the transfer capacity for maintaining the reliability of communication and communication quality such as a wave reachable range.

The above and other objects and features of the present invention will be understood by reading carefully the following description with accompanying drawings. Preferred embodiments of the present invention will be described in more detail referring to the accompanying drawings. The drawings are illustrative and are not to be limitative of the scope of the present invention.

DESCRIPTION OF THE PREFERRED EMBODIMENT(S)

Preferred embodiments of the present invention are described in more detail below referring to the accompanying drawings.

Here, the present invention should by no means be limited to the following embodiments, and various changes or modifications may be suggested without departing from the gist of the invention.

[A] First Embodiment

Figure 1:
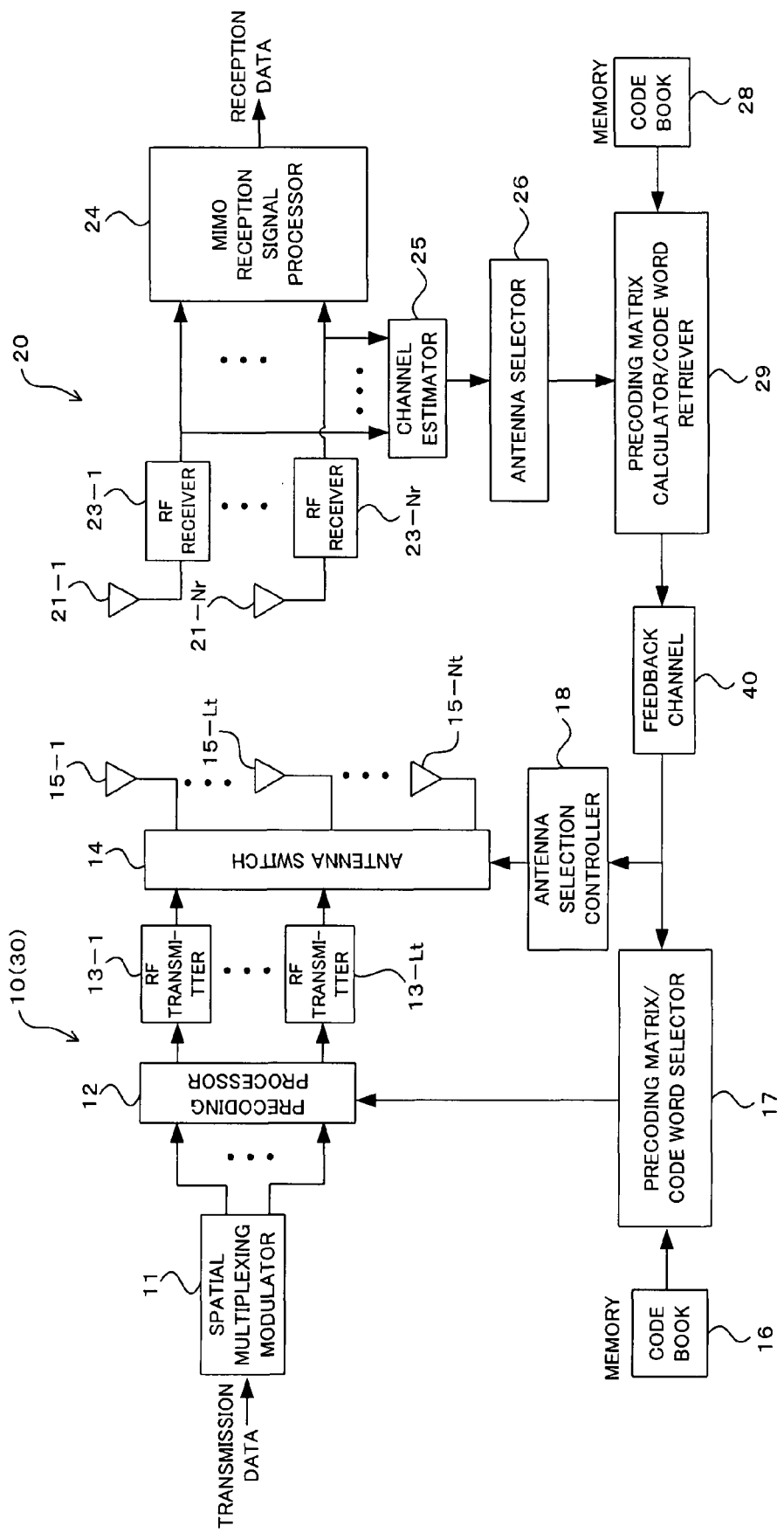
FIG. 1 is a block diagram showing a construction of a multi antenna radio communication system according to a first embodiment of the present invention.

FIG. 1 is a diagram showing a construction of a multi antenna radio communication system according to a first embodiment of the present invention. The radio communication system of FIG. 1 includes at least one base station apparatus (BS) 10 as a transmitter, and at least one mobile station apparatus (MS) 20 as a receiver. An important part of the BS 10 includes a spatial multiplexing modulator 11, a precoding processor 12, $L_t$-number (Lt is a integer greater than 1) of RF transmitter 13-1 through 13-$L_t$ (hereinafter will be described as an RF transmitter 13 when individuals are not distinguished), an antenna switch 14, $N_t$-number ($N_t$ is an integer greater than 1, and $N_t \geq L_t$) of transmission antennas 15-1 through 15-$N_t$ (hereinafter will be described as transmission antenna 15 when individuals are not distinguished), a code book memory 16, a precoding matrix/code word selector 17, and a transmission antenna selection controller 18.

On the other hand, an important part of the MS 20 includes $N_r$-number ($N_r$ is an integer greater than 1) of reception antenna 21-1 through 21-$N_r$ (hereinafter will be described as a reception antenna 21 when individuals are not distinguished), $N_r$-number of RF receiver 23-1 through 23-$N_r$ (hereinafter will be described as an RF receiver 23 when individuals are not distinguished), a MIMO reception signal processor 24, a channel estimator 25, an antenna selector (a determiner of antenna to be used) 26, a code book memory 28, a precoding matrix calculator/code word retriever 29. Here, $N_r$-number of RF receiver 23 means that the maximum number of reception data stream which can be processed by the MS 20 (reception RF unit 23) at the same time is $N_r$, and thus, the maximum value is $N_r$ as described above.

(Description of the Construction of the BS 10)

Here, the spatial multiplexing modulator 11 of the BS 10 performs mapping and modulation of the coding sequence obtained by means of necessary error coding, for example, turbo coding, into symbols (a signal of a data channel) having signal points of such as a predetermined modulation scheme, for example, QPSK (Quadrature Phase Shift Keying) and 16 QAM (Quadrature Amplitude Modulation). For example, $N_s$-number [$1 \leq N_s \leq \min(L_t, N_r)$] of transmission data streams can be obtained. In this instance, this spatial multiplexing modulator 11 can perform multiplexing processing of known signals (a pilot signal or a preamble signal), in addition to a signal of a data channel, between the BS 10 and the MS 20 and a control channel signal (control symbols) which transfers control information, used for channel estimation.

The precoding processor (precoding means) 12 performs precoding of $N_s$-number ($1 \leq N_s \leq N_r$) of transmission data streams using the precoding matrix (matrix) or the code word given by the precoding matrix/code word selector 17. The precoding processor 12, as described below, maps the transmission data streams to $L_t$-number of transmission antennas 15 selected by the transmission antenna selection controller 18, thereby performing beam forming by $L_t$-number of transmission antennas 15. Here, the precoding (beam forming) is performed when the number $N_s$ of transmission data streams <the number $L_t$ of selection transmission antennas (that is, selectively performed corresponding to the number of selected transmission antennas), and the precoding is not performed when the number $N_s$ of transmission data streams =the number $L_t$ of selected transmission antennas in order to perform MIMO multiplexing transmission.

Each of the RF transmitter 13 performs necessary radio transmission processing including DA (Digital to Analog) conversion and frequency conversion (up-conversion) to a radio frequency (RF) of $L_t$-number of transmission data streams. The antenna switch 14, under control of the transmission antenna selection controller 18, selects $L_t$-number of transmission antennas 15 to be used in transmission to connect to the RF transmitter 13. Each of the transmission antennas 15 radiates, into space to the MS 20, a transmission RF signal from the RF transmitter 13 which is connected through the antenna switch 14.

The code book memory 16 memorizes beforehand a code book (code word) for use in determining a precoding matrix (or vector, hereinafter the same) to be used at the time of the above-mentioned precoding. The code book is defined, for example, as a set of a predetermined Unitary Matrix (its elements are defined as code words), and is determined beforehand on the basis of the number $N_s$ of data streams and the number $L_t$ of transmission antennas and the number (L) of feedback bits. In this instance, elements in the code book are defined as code words. Since it is necessary to use the same code book with the MS 20, the same code book is stored on the MS 20 end (code book memory 28), too.

Accordingly, without being notified (fedback) of all of the element information of the precoding matrix obtained on the basis of the above-mentioned CSI from the MS 20, if limited information (for example, the indexes of code words of the code book) is notified, it becomes possible to determine the precoding matrix to be used on the basis of the notified information. This type of notification method using the limited information is called a limited feedback transfer, and it is possible to effectively use the up-link band from the MS 20 to the BS 10.

In this instance, in the present example, the transfer of the limited information such as the above-mentioned index, etc., is performed using a feedback channel which is indicated by reference character 40 in FIG. 1. The feedback channel 40 is one of the uplink channels from the transmission system of the MS 20 to the reception system of the BS 10. In FIG. 1, these transmission system of the MS 20 and the reception system of the BS 10 are not illustrated.

Next, the precoding matrix/code word selector 17 receives antenna indexes (antenna selection information) which are notified from the MS 20 through the feedback channel 40, and notifies the transmission antenna selection controller 18 of the received antenna indexes. In addition, the precoding matrix/code word selector 17 gives the precoding processor 12 a precoding matrix which is necessary in the above-mentioned precoding processing. At that time, the precoding matrix notified from the MS 20 through the feedback channel 40 can be given as it is, or code words identified from the indexes notified by the above-mentioned limited feed back transfer can be selected from the above-mentioned code book, and the corresponding precoding matrix can be selected and given.

The transmission antenna selection controller 18 controls the antenna switch 14 according to the above-mentioned antenna selection information, and controls connection between the RF transmitter 13 and the transmission antenna 15.

(Description of the Construction of the MS 20.

On the other hand, in the MS 20, each of the reception antenna 21 receives RF signals sent from the transmission antenna 15 of the BS 10. Each of the RF receivers 23 performs necessary radio reception processing including frequency conversion (down-conversion) of the reception RF signal received by the reception antenna 21 into a base band frequency, and AD (Analog to Digital) conversion.

The MIMO reception signal processor 24 separates the reception signal (digital base band signal) processed by the RF receiver 23, that is, the reception signal spatially multiplexed, into transmission data streams, and demodulates and decodes the reception signal. This separation process can be performed by the method in which the inverse matrix of the channel correlation matrix is used on the basis of CSI obtained by the correlation operation between the above-mentioned pilot signal (or the preamble signal, hereinafter the same) and the pilot replica or by the method in which the MLD (Maximum Likelihood Detection) algorithm is used.

The channel estimator 25 obtains the above-mentioned CSI by using correlation operation between the pilot signal processed on the RF receiver 23 and the pilot replica the MS 20 holds beforehand (that is, the channel estimator 25 estimates a channel response).

The to-be-used antenna selection unit 26 selects (determines) combinations of the transmission antennas 15 and the reception antennas 21 to be used in communication with the BS 10 on the basis of the predetermined antenna selection standard. In the present example, a hierarchical selection is performed. That is, the transmission antennas 15 and the reception antennas 21 are grouped into multiple antenna groups composed of multiple transmission antennas 15 and reception antennas 21, and an antenna group, out of the multiple antenna groups, which satisfies a first antenna selection criterion is selected. Of the selected antenna group, a combination of the transmission antennas 15 and the reception antennas 21 which satisfies a second antenna selection criterion is selected.

In this instance, if the number $N_t$ of transmission antennas is smaller than a certain reference number, all the combinations of antennas can be selected. In addition, a part of or all of the reception antennas 21 can be treated as elements common to all of the antenna groups. If all of the reception antennas 21 are treated as elements common to all of the antenna groups, it means that only the transmission antennas 15 are grouped into multiple groups.

This type of grouping means that element estimation values of the CSI (channel matrix) obtained by the channel estimator are grouped. Selecting a combination of the transmission antennas 15 and the reception antennas 21 means that a combination of element estimation values of the channel matrix is selected. A specific example of such grouping and the details of antenna selection standard will be described later.

That is, the antenna selector 26 has a function as a grouping means which groups $(N_r \times N_t)$-number of channel estimation values, which are obtained between the transmission antennas 15 and the reception antennas 21, into multiple blocks each including $(L_r \times L_t)$-number of element estimation values.

The code book memory 28, as described above, stores beforehand the same code book as that of the BS 10. The precoding matrix calculator/code word retriever 29 generates information (feedback information) necessary for the above-mentioned precoding performed on the BS 10 on the basis of CSI obtained by the channel estimator 25, and notifies the BS 10 of the generated information through the feedback channel 40. In the case of precoding matrix calculated based on the above-mentioned CSI, or in the case of the above-mentioned limited feedback transfer, the precoding matrix calculator/code word retriever 29 generates indexes of code words retrieved from the code book in the code book memory 28 as the above-mentioned feedback information.

(Explanation of System Operation)

Hereinafter, referring to FIG. 2 through FIG. 5, a description will be made of an operation of the MIMO communication system of the present embodiment, as described above, with an eye on the antenna selection method, in particular.

Figure 5:
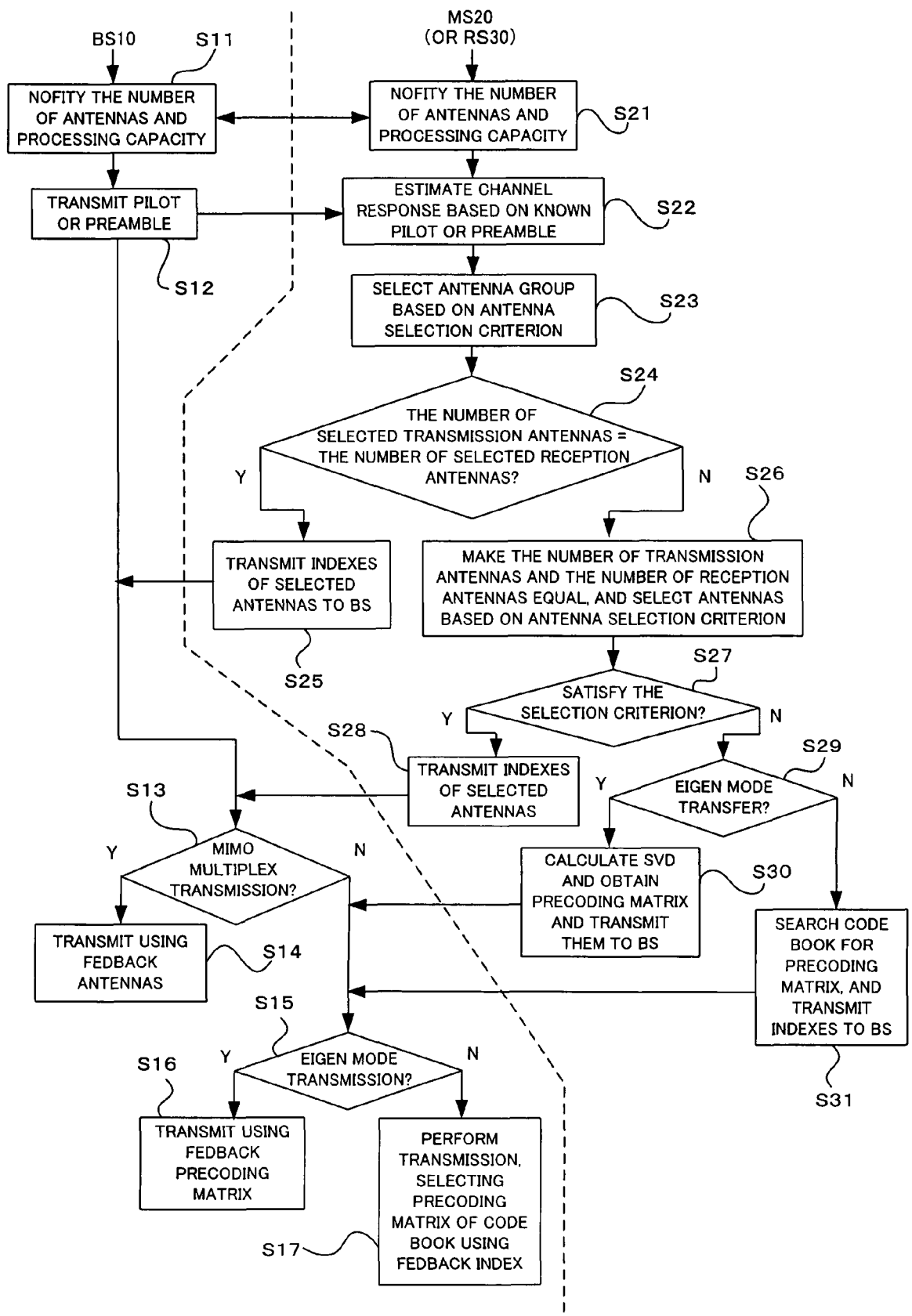
FIG. 5 is a flowchart for describing a system operation (antenna selection method) according to the first embodiment of the present invention.

First of all, as described in FIG. 5, the BS 10 and the MS 20 transceives each other information about the number of their transmission/reception antennas and about processing capacity of data streams, there by acknowledging the number of antennas and the processing capacity of the opponent in communication (steps S11 and S21).

Then, the BS 10 transmits a pilot signal to the MS 20 (step S12). The channel estimator 25 of the MS 20 estimates (obtains CSI) (step S22) a channel response by a correlation operation between the reception pilot signal and the pilot replica.

On the basis of the obtained CSI, the MS 20 selects one antenna group which satisfies a predetermined antenna selection criterion. That is, the transmission antennas 15 of the BS 10 is grouped into multiple antenna groups in such a manner that the number ($L_t$) of transmission antennas for each group is greater than the number ($L_r$) of reception antennas usable on the MS 20. Of the antenna groups, one antenna group which satisfies the above-mentioned antenna selection criterion is selected.

Figure 2:
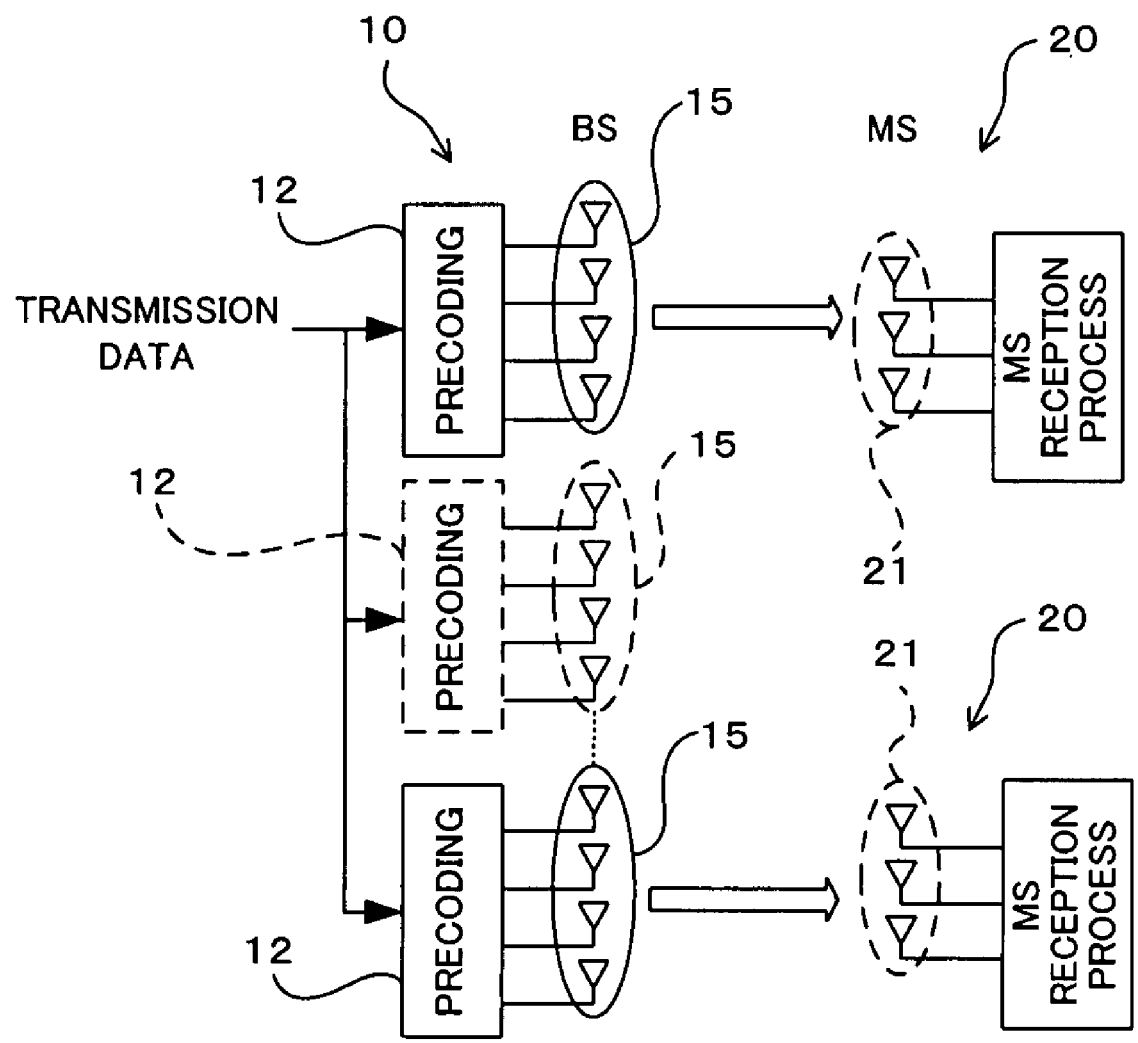
FIG. 2 is a schematic diagram for describing antenna grouping in the system shown in FIG. 1.
Figure 4:
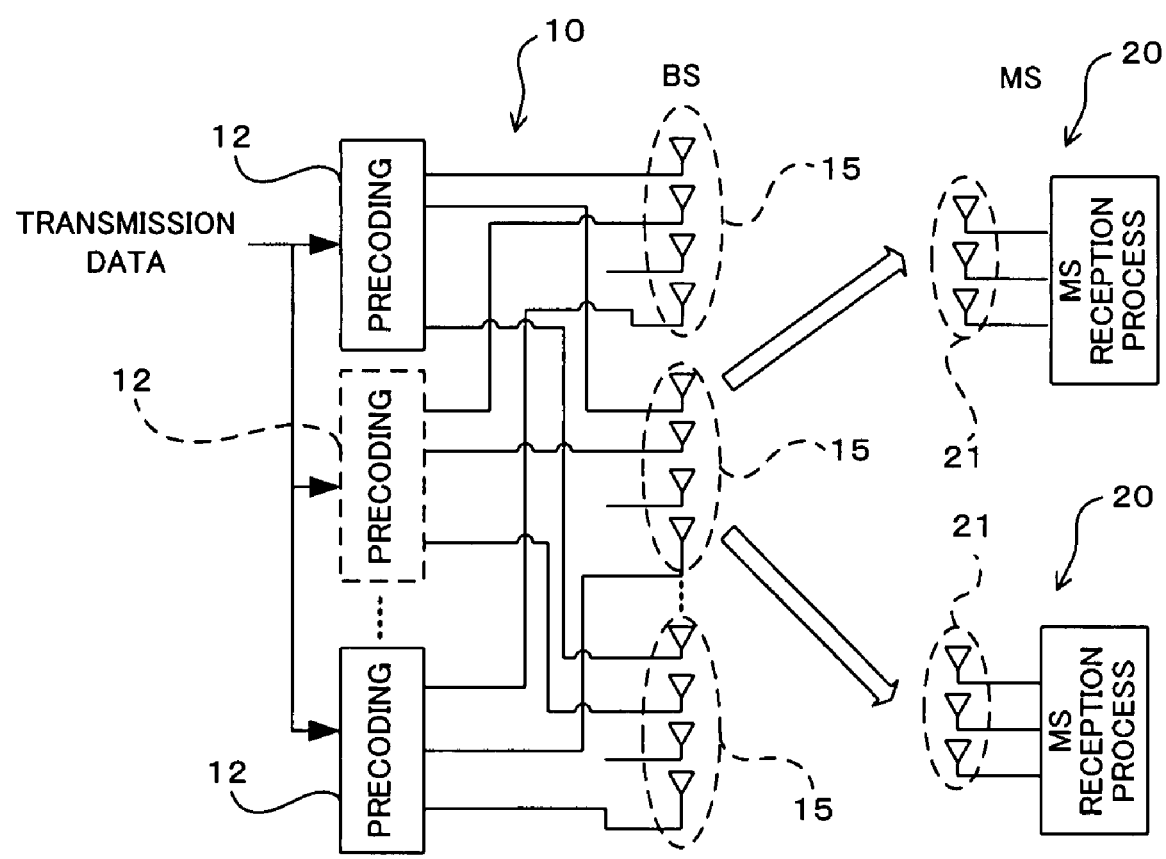
FIG. 4 is a schematic diagram for describing another example of antenna grouping in the system shown in FIG. 1.

Here, the above-mentioned grouping, as schematically described in FIG. 2, can be performed in such a manner that adjacent $L_t$-number of transmission antennas are grouped into one group, or in such a manner that, as schematically described in FIG. 4, $L_t$-number of transmission antennas which are disposed at an equal interval (distance) from a certain reference transmission antenna 15 are grouped into one group.

Figure 3:
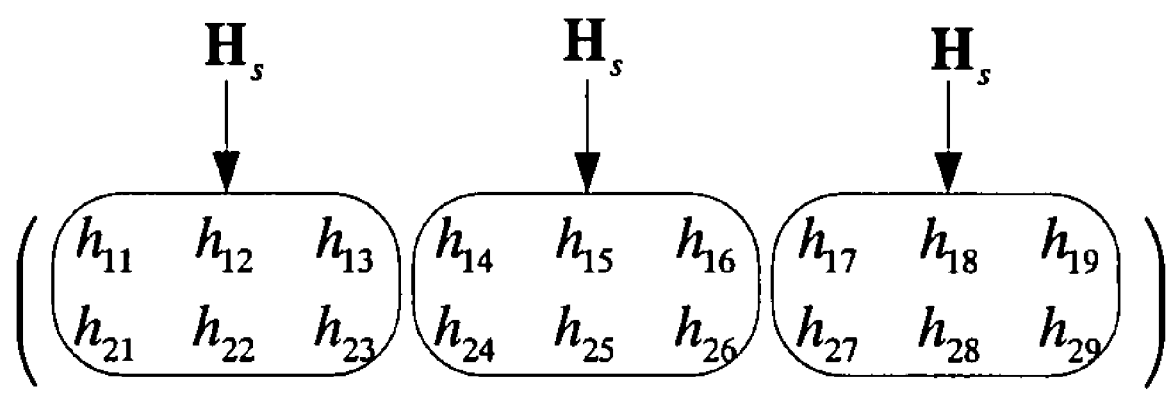
FIG. 3 is a diagram for describing grouping of channel matrix corresponding antenna grouping according to the first embodiment of the present invention.

If the number $N_t$ of transmission antennas of the BS 10 is equal to 9, the number $N_r$ and $L_r$ of reception antennas of the MS 20 is equal to 2, and the number $L_t$ of transmission antennas for each antenna group is equal to 3, the grouping as described in FIG. 3 is equal to grouping 18 element estimation values ($h_{ij}$: i=1 through 2, j=1 through 9) of a channel matrix obtained as an $L_r \times N_t = 2 \times 9$ into three blocks ($2 \times 3$ matrix $H_s$) composed of $L_r \times L_t = 2 \times 3$ (=6) adjacent element estimation values. Accordingly, selecting an antenna group is equal to selecting a block which satisfies the above mentioned antenna selection criterion for the unit of the block.

According to the similar theory, grouping as shown in FIG. 4 means grouping into blocks (channel matrix $H_s$) composed of $2 \times 3 = 6$ element estimation values which are disposed at an equal distance in a channel matrix obtained as $L_r \times N_t = 2 \times 9$ matrix. In this case, one antenna group is capable of communicating with multiple MS 20 (multi user MIMO transmission).

In this manner, there are a variety of methods of selecting estimation values composing one block (matrix $H_s$), that is, variety of methods of grouping an antenna group other than the above-described one. For example, grouping can be performed in such a manner that element estimation values included in a certain block are included in another different block. However, to limit the operation amount to the minimum, simple grouping as shown in FIG. 2 (FIG. 3) or FIG. 4 is preferable.

Here, on the assumption of the above-described grouping, the MS 20 (the to-be-used antenna selector 26) selects an antenna group (a block of element estimation values) using any one of the following antenna selection criteria as shown in the following items (a) through (c), that is, a first antenna selection criterion relating to communication quality with the BS 10. That is, of the multiple blocks of the above-mentioned element estimation values, the to-be-used antenna selector 26 has a function as a block selecting means which selects a block that satisfies any one of the following antenna selection criteria (a) through (c).

(a) Selection Criteria of Capacity

The MS 20 (to-be-used antenna selector 26) selects an antenna group which maximizes the communication capacity with the BS 10 using the following formula (1)

$$\Gamma = \arg\max_{H_s \in H} \left( \log_2 \det \left[ I_{Lr} + \frac{\rho}{N_t} H_s H_s' \right] \right) \quad (1)$$

$$\propto \arg\max_{H_s \in H} \det(H_s H_s')$$

where $H_s$ is a channel matrix of the antenna group; ρ is a mean SNR (Signal to Noise Ratio) of each reception antenna 21 in the antenna group; det is a determinant; $H_s'$ is a complex conjugate transpose of $H_s$.

(b) Selection Criterion of Singular Value

The MS 20 (to-be-used antenna selector 26) selects an antenna group which maximizes the minimum singular value $\lambda_{min}\{H_s\}$ of the channel matrix $H_s$ under the following formula (2) (this means that the minimum SNR is maximized).

$$\Gamma = \arg\max_{H_s \in H} \lambda_{min}\{H_s\} \quad (2)$$

(C) Selection Criterion for Condition Number

The MS 20 (to-be-used antenna selector 26) selects an antenna group which minimizes a channel condition number, that is, the value obtained by diving the maximum singular value $\lambda_{max}\{H_s\}$ by the minimum singular value $\lambda_{min}\{H_s\}$ (this means that an error rate is optimized) under the following formula (3).

$$\Gamma = \arg\max_{H_s \in H} \frac{\lambda_{max}\{H_s\}}{\lambda_{min}\{H_s\}} \quad (3)$$

Here, when the antenna group is selected as described above, the MS 20 (to-be-used antenna selector 26), as described in FIG. 5, compares the number of transmission antennas and the number of reception antennas included in the selected antenna group to evaluate whether or not the number $L_t$ of transmission antennas is smaller or equal to the number $L_r$ of reception antennas (step S24).

If the evaluation result is true, the precoding matrix calculator/code word retriever 29 of the MS 20 transmits (notifies) the indexes of the selected transmission antennas 15 to the BS 10 through the feedback channel 40 (from Y route of step S24 to step S25).

On the other hand, if the evaluation result is false, that is, if the number $L_t$ of transmission antennas>the number $L_r$ of reception antennas (the number of data streams is $N_s$), the to-be-used antenna selector 26 makes the number $L_t$ of transmission antennas and the number $L_r$ of reception antennas included in the selected antenna group equal, and searches all the combinations of the transmission and the reception antennas included in the selected antenna group, and reevaluates whether or not the combinations satisfy a predetermined antenna selection criterion (a second criterion for antenna selection based on communication quality) (for example, that the condition number of the above-mentioned channel is not smaller than a certain threshold value) (steps S26 and S27).

In this instance, adjustment (selection) of transmission/reception antennas to be reevaluated can be performed by means of calculating SINR (Signal-to-Interference and Noise power Ratio) of each of the antennas 15 and 21 to exclude the antennas 15 and 21 having the minimum SINR, or by means of selecting antennas 15 and 21 with a large SINR or a large mean electric power.

As a result, if the antenna selection criterion is satisfied, the precoding matrix calculator/code word retriever 29 of the MS 20 transmits (notifies) the indexes of the selected transmission antennas 15, like in step S25, to the BS 10 through the feedback channel 40 (Y route of step S27 to step S28).

That is, the to-be-used antenna selector 26 has a function as an element estimation value selecting means which selects combinations satisfying the second selection criterion relating to communication quality, out of the combinations of element estimation values of the block selected by the above-mentioned block selecting means. The selecting means has a function as an evaluating means which evaluates whether or not any combination exists which satisfies a criterion relating to MIMO communication between the same number of reception antennas and transmission antennas 15, out of the above-mentioned combinations of the element estimation values.

In addition, the precoding matrix calculator/code word retriever 29 has a function as a notifying means which generates antenna selection information for the BS 10 on the basis of the selection result by the to-be-used antenna selector (block selecting means or element estimation value selecting means) 26 and notifies the BS 10 of the generated information.

On the other hand, if the antenna selection criterion is not satisfied, the to-be-used antenna selector 26 further evaluates whether or not eigen mode transmission is to be performed (N route of step S27 to step S29). As a result, if the to-be-used antenna selector 26 decides that the to-be-used antenna selector 26 is to perform eigen mode transmission, the precoding matrix calculator/code word retriever 29 (the Singular Value Decomposition: SVD) of the MS 20 calculates the SVD (Singular Value Decomposition) of the CSI (channel matrix) to obtain the precoding matrix (described below) and transmits the obtained SCI to the BS 10 through the feedback channel 40 (from Y route of step S29 to step S30).

If it is decided by the to-be-used antenna selector 26 that eigen mode transmission is not to be performed (that is, to perform limited feedback transmission), the precoding matrix calculator/code word retriever 29 of the MS 20 searches for the indexes of code words of the code book in the code book memory 28, and transmits the indexed of the code word to the BS 10 through the feedback channel 40 (from N route of step S29 to step S31).

That is, the precoding matrix calculator/code word retriever 29 has a function as a antenna selection information generating means which generates, if it is evaluated that a combination of the element estimation values exists by the evaluating unit, the antenna selection information (antenna index) corresponding to the combination of the element estimation values, and generates, if it is evaluated that such a combination does not exist by the evaluating unit, precoding information (indexes of precoding matrix or cord words) necessary for precoding transmission of the BS 10 on the basis of the combination of element estimation values, as the antenna selection information, and notifies the BS 10 of the generated information.

On the other hand, on the BS 10, the precoding matrix/code word selector 17 evaluates whether or not MIMO multiplexing transmission is to be performed on the basis of the antenna index notified from the MS 20 through the feedback channel 40 in the above-mentioned step S25 or S28 (step S13). That is, the precoding matrix/code word selector 17 decides that MIMO multiplexing transmission is to be performed if the number $N_s$ of transmission data streams=the number $L_t$ of selection transmission antennas.

As a result, if it is evaluated that MIMO multiplexing transmission is to be performed, the transmission antenna selection controller 18 of the BS 10 controls the antenna switch 14 to connect the transmission antennas 15 which are identified by antenna indexes notified as described above to the RF transmitter 13 in which transmission data streams are identified to exist, and performs MIMO multiplexing transmission (from Y route of step S13 to step S14).

On the other hand, if it is decided that MIMO multiplexing transmission is not to be performed, the BS 10 (precoding matrix/code word selector 17) evaluates whether or not eigen mode transmission is to be performed (N route of step S13 to step S15). As a result, if the precoding matrix is notified from the MS 20 through the feedback channel 40, and if it is evaluated that eigen mode transmission is to be performed in step S15, the precoding matrix/code word selector 17 gives the precoding processor 12 the precoding matrix. In addition, the transmission antenna selection controller 18 controls the antenna switch 14 to connect the RF transmitter 13 in which a transmission data streams exists to the selected transmission antennas 15 (in this case, the number of antennas is greater than the number of reception antennas selected on the MS 20).

With this construction, the BS 10 uses the transmission antennas 15 which is larger in number than the reception antennas (transmission data streams) on the MS 20 to perform beam forming due to the above-mentioned precoding and performs transmission to the MS 20 (Y route of step S15 to step S16).

On the other hand, if it is decided that code word indexes are notified from the MS 20 through the feedback channel 40 in the step S29, and if it is decided that limited feedback transmission, not the eigen mode transmission, is to be performed, the precoding matrix/code word selector 17 retries the code book memory 16 for the code book corresponding to the indexes of the code words, and determines the precoding matrix on the basis of the corresponding code book to give the precoding matrix to the precoding processor 12 on the basis of the corresponding code book. In addition, like in eigen mode transmission, the transmission antenna selection controller 18 controls the antenna switch 14, thereby connecting the RF transmitter 13 in which transmission data streams exist, to the selected transmission antennas 15 (in this case, also, the number of transmission antennas is greater than the number of selected reception antennas).

With this arrangement, the BS 10 uses the transmission antennas 15 which is greater in number than the reception antennas on the MS 20 (the number of transmission data streams) to perform beam forming by the aforementioned precoding, and transmits the resultant beam forming to the MS 20 (N route of step S15 to step S17).

That is, when the precoding matrix/code word selector 17 receives precoding information (precoding matrix or code words) as antenna selection information by the precoding matrix/code word selector 17, the precoding processor 12 performs precoding transmission by means of transmission antennas 15 corresponding to the combination of element estimation values on the basis of the precoding information.

In this instance, if the transmission antennas 15 in one antenna group of the BS 10 is not included in the multiple MSs 20 (for example, in FIG. 2 as described above), it is possible to transmit to the MSs 20 at the same time. If a part of or all of the transmission antennas 15 in one antenna group of the BS 10 multiplex are included with respect to multiple MS 20, time divisional transmission is to be performed with respect to the multiplexed transmission antennas 15.

In a case of TDD (Time Division Duplex), reciprocity of channels makes it possible to estimate channel information based on the sounding of the BS 10 and the MS 20. In a case of FDD (Frequency Division Duplex), the BS 10 acknowledges down-link channel information due to the feedback from the MS 20 to the BS 10.

In addition, regularly or irregularly, if the reception quality information of the MS 20 acknowledged by the BS 10 is transferred to the MS 20, and if the above mentioned hierarchical antenna selection or precoding processing is performed again with respect to the necessity, it is possible to accommodate the latest transfer environment.

(Description of Precoding Processing)

Next, the details of the above-mentioned eigen mode transfer in performing the precoding processing (beam-forming) and the limited feedback transfer are described.

(Eigen Mode Transfer)

If the CSI complete between the BS 10 and the MS 20 is well known, the precoding matrix calculator/code word retriever 29 of the MS 20 performs singular value decomposition (SVD) of the CSI, and obtains the decomposition of the matrix as precoding matrix.

For example, if in the case of $N_s$-number of transmission data streams, $L_t$-number of transmission antennas, $L_r$-number of reception antennas 21, $N_s \leq \min(L_t, L_r)$, the CSI (channel matrix H) is a matrix of $L_r \times L_t$, and if the H is subscribed to singular value decomposition, the following formulas (4) and (5) are obtained.

$$H = UDV' \quad (4)$$

$$D = \mathrm{diag}(\sqrt{\lambda_1}, \sqrt{\lambda_2}, \ldots, \sqrt{\lambda_m}, 0, \ldots, 0) \quad (5)$$

In this instance, U is a left singular matrix, V is a right singular matrix, D is a diagonal matrix, and its element $\lambda_1, \ldots \lambda_m$ are proportional to the obtain of the eigen mode. The obtain of the eigen mode is obtained, and the first eigen mode $\lambda_1$ is the maximum, the $m^{th}$ eigen mode $\lambda_m$ is the minimum. Here, m presents the rank of the channel matrix H.

Then, when precoding is performed, the optimum precoding matrix is a left $N_s$ of the right singular matrix V (indicated by $V_{1:Ns}$). Accordingly, the precoding processor 12 of the BS 10 uses the precoding matrix $F = V_{1:Ns}$ for mapping $N_s$-number of transmission data streams to $L_t$-number of transmission antennas 15 under the following formula (6).

$$x = Fs \quad (6)$$

Here, s represents $N_s \times 1$ transmission vector; x represents transmission antenna data vector $L_t \times 1$.

Accordingly, on the reception end (MS 20) of the reception signal y is described as in the following formula (7).

$$y = HFs + n \quad (7)$$

Here, n represents noise vector of $L_r \times 1$. In addition, y represents the reception signal of $L_r \times 1$ and the signal of each reception antenna 21 is multiplexed with transmission signals. To obtain transmission signals y, H, F given as known values on the MS 20, to obtain transmission signals ŝ, the maximum likelihood (ML) method can be applied in the following formula (8), and since the complexity is enormous, the linear decoder in which the complexity is small as in the following formulas (9) and (10) is employed as in the following formulas (9) and (10).

$$\hat{s} = Q[Gy] \quad (8)$$

Here, Q[ ] represents a demapper, G represents the matrix of $N_s \times L_r$.

That is, when a ZF (Zero Forcing) linear decoder is applied, G of the above formula (8) is expressed by the following formula (9).

$$G = (HF)^+ \quad (9)$$

where $(\ )^+$ expresses a pseudo-inverse matrix.

In addition, when applying MMSE (Minimum Mean Square Error) linear decoder, G of the above formula (8) can be expressed by the following formula (10)

$$G = [F'H'HF + (N_s/\rho)I_{N_s}]^{-1} F'H' \qquad (10)$$

where $(\ )^{-1}$ expresses inverse matrix.

(Limited Feedback Transfer)

Hereinafter, a description will be made of a principle of limited feedback transfer.

On the basis of the number $N_s$ of transmission data streams, the number $L_t$ of transmission antennas, the number (L) of feedback bits, the same code book is determined between the transmitter end (BS 10) and the receiver end (MS 20). Then, as described above, it is assumed that the BS 10 and the MS 20 stores the same code book in the code book memory 16 and the code book memory 28.

On MS 20, the channel estimator 25 performs channel estimation, and obtains CSI, and on the basis of the obtained CSI, the optimum code word is selected according to any one of the following criteria (1) through (3).

(1) MMSE (Minimum Mean Square Error) Selection Criterion

The MSE (Mean Square Error) used in the MS 20 (precoding matrix calculator/code word retriever 29) is expressed by the following formula (11), assuming the H and F are already known, $$MSE(F) = \frac{\varepsilon_s}{N_s}\left(I_{N_s} + \frac{\rho}{N_s} F' H' H F\right)^{-1} \qquad (11)$$

The precoding matrix calculator/code word retriever 29 selects a code word which minimizes the Trace (tr) or the Determinant (det) of MSE of this formula (11), out of the code book. That is, the following formula (12) is selected by the following formula (13).

$$F = \arg\min_{F_j \in F} tr[MSE(F_j)] \qquad (12)$$

$$F = \arg\min_{F_j \in F} \det[MSE(F_j)] \qquad (13)$$

(2) Selection Criterion of Capacity

The MS 20 (precoding matrix calculator/code word retriever 29) selects a code word, out of a code book, in such a manner that the capacity is maximized under the following formula (14).

$$F = \arg\max_{F_j \in F} \left(\log_2 \det\left[I_{N_s} + \frac{\rho}{N_s} F' H' H F\right]\right) \qquad (14)$$

(3) Singular Value Selection Criterion

The MS 20 (precoding matrix calculator/code word retriever 29) can select a code word, out of the code book, in such manner that the minimum singular value is maximized.

$$F = \arg\max_{F_j \in F} \lambda_{min}\{HF_f\} \qquad (15)$$

Then, the MS 20 (precoding matrix calculator/code word retriever 29) transfers the index (L bit) of the code word selected under the above-described criterion to the BS 10 through the feedback channel 40.

With this arrangement, on the BS 10, as described above, on the basis of the received index, the matrix (or vector) is used as a precoding matrix by use of the corresponding code book. In this instance, in the case of the limited feedback transfer, similar to the eigen mode, linear decoder (ZF liner decoder or MMSE linear decoder) can be applied.

As described above, according to the present invention, the transmission antennas 15 of the BS 10 and the reception antennas 21 of the MS 20 are grouped into multiple antenna groups composed of multiple transmission antennas 15 and multiple reception antennas. Out of the antenna groups, antenna groups satisfying the first antenna selection criterion are selected, and out of the selected antenna groups, the combinations of the transmission antennas 15 and the reception antennas 21 satisfying the second antenna criterion are selected. Thus, even if the number of transmission antennas 15 on the BS 10 end is so large that the number of transmission/reception antennas is increased (that is, the number of element estimation values of the channel matrix becomes significantly great), it is possible to realize optimized communication according to radio environment by selecting the optimized transmission antennas 15 and reception antennas 21 corresponding to radio communication under high speed with a smaller calculation amount than the previous example, thereby realizing the optimized communication corresponding radio environment. Further, costs and complexity can also be reduced.

Furthermore, since grouping is performed in such a manner that the number of transmission antenna is greater than the number of reception antennas in one antenna group, and since if the combination satisfying the predetermined (the above mentioned first or second) antenna selection criterion exists, MIMO communication is performed using such a communication transmission and reception antennas, and if the combination appropriate for MIMO communication does not exits, precoding (beam-forming) is performed using a greater number of antennas 15 than the reception antennas, communication quality such as transmission capacity and electric wave reachable range in which communication reliability is maintained is secured in what kind of radio communication environment.

Here, when the BS 10 receives a signal from the MS 20, if not all of the reception antennas are used but an antenna group is selected, performance of MRC (Maximum Ratio Combining) can be improved.

[B] Second Embodiment

Figure 6:
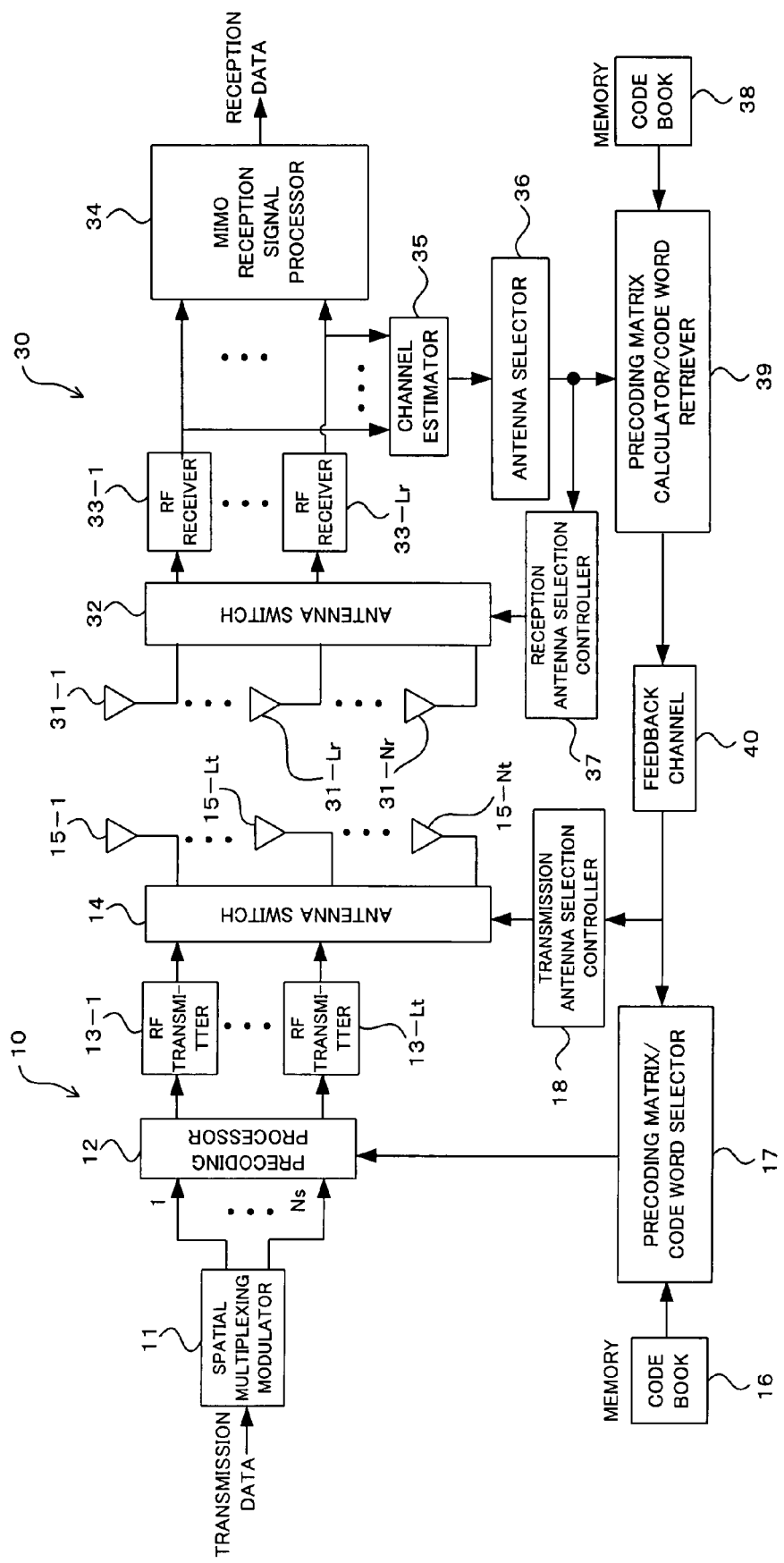
FIG. 6 is a block diagram showing a construction of a multi antenna radio communication system according to the second embodiment of the present invention.

FIG. 6 is a block diagram showing a construction of multi antenna radio communication system according to second embodiment of the present invention. The radio communication system of FIG. 6 includes at least one base station (BS) 10 and at least one relay station (RS) apparatus 30. The BS 10 is constructed as in that of the first embodiment; the important part of the RS 30 includes $N_r$-number ($N_r$ is an integer greater than 1) of reception antennas 31-1 through 31-$N_r$ (hereinafter described as reception antenna 31 when distinction is not made), an antenna switch 32, $L_r$-number ($L_r$ is an integer greater than 1 and $L_r \leq N_r$) of RF receiver 33-1 through 33-$L_r$ (hereinafter described as an RF receiver 33 when distinction is not made), a MIMO reception signal processor 34, a channel estimator 35, an antenna selector (to-be-used antenna selector) 36, an antenna section controller 37, a code book memory 38, and a precoding matrix calculator/code word retriever 39.

That is, the RS 30 of the present example has approximate the same construction of the MS 20 as described in FIG. 1, but since it has an antenna switch 32 and antenna section controller 37, it is possible for the RS 30 to select the reception antenna 31 to be used.

That is, the antenna switch 32 connects arbitrary reception antennas 31 and arbitrary RF receivers 33 according to control from the antenna section controller 37; the reception antenna selection controller 27 performs connection control between the reception antennas 31 determined (selected) by the to-be-used antenna selector 36 and the RF receiver 33 according to the procedure similar the first embodiment.

In this instance, the reception antenna 31, the RF receiver 33, the MIMO reception signal processor 34, the channel estimator 35 the to-be-used antenna determiner 36, the antenna section controller 37, the code book 38, the precoding matrix calculator/code word retriever 39 are the same as or similar to the already described reception antenna 21, the RF receiver 23, the MIMO reception signal processor 24, the channel estimator 25 the to-be-used antenna selector 26, the reception antenna selection controller 27, the code book memory 28, the precoding matrix calculator/code word retriever 29.

Figure 7:
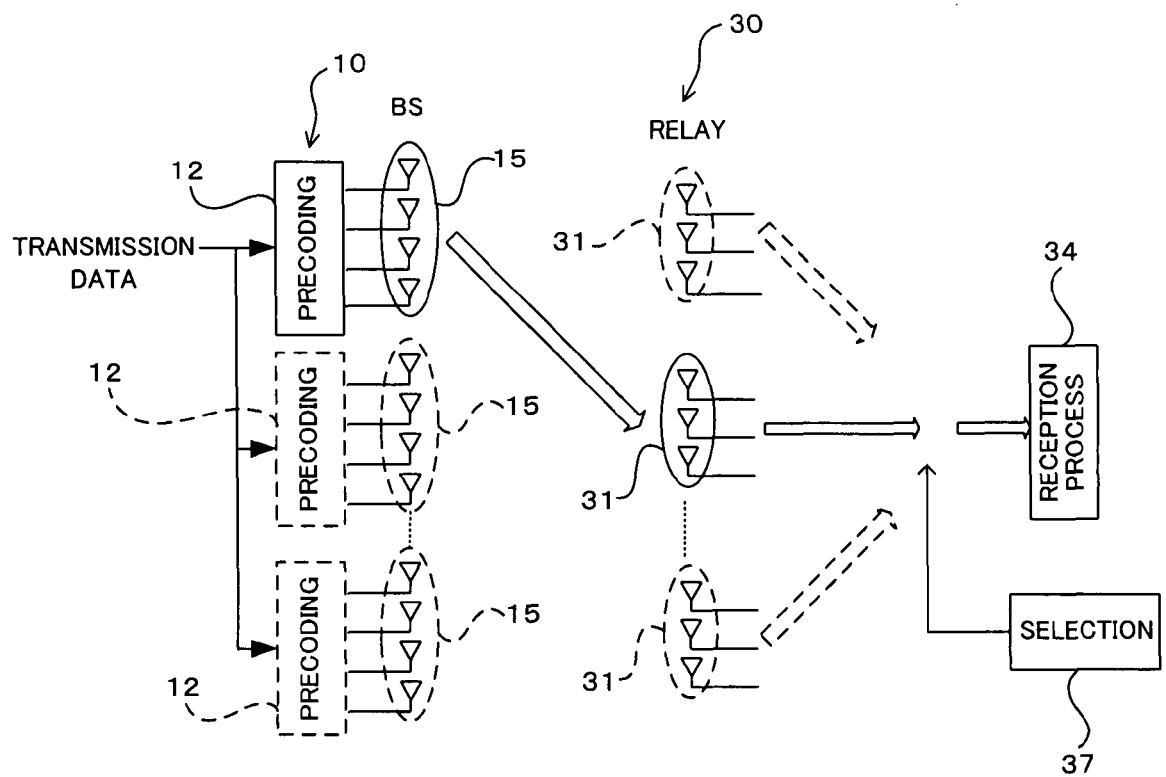
FIG. 7 is a schematic diagram for describing antenna grouping in the system shown in FIG. 6.

Here, in the present example, when the BS 10 communicates with the RS 30, all the reception antennas 31 on the RS 30 are not treated as construction elements of one antenna group, and as schematically described in FIG. 7, for example, they are grouped with respect to the reception antennas 31.

In such a case, also, as described in FIG. 2 and in FIG. 4, in the BS 10 and the RS 30, adjacent antennas or antennas with equal intervals can be grouped as elements of one antenna group. In addition, in the present example, also, a part of transmission antennas 15 or reception antennas 31 which are included in one antenna group can be included in another antenna group. Further, it is preferred that the number of transmission antennas of the BS 10 included in one antenna group is greater than the number of reception antennas of the RS 30.

With such grouping as precondition, in the present example, as in the case of the first embodiment, hierarchical antenna selection makes possible selection of optimal combination according to radio environment, thereby performing beam forming according MIMO communication or precoding.

That is, on the RS 30, the to-be-used antenna determiner 36 selects, out of the antenna groups, antenna groups that satisfy the above-mentioned first antenna selection criterion on the basis of the CSI obtained by the channel estimator 35. Out of the selected antenna groups, the RS 30 selects combinations of transmission antennas 15 and reception antennas 31 which satisfy the above-mentioned second antenna selection criterion. Then, if there is a combination in which the transmission antennas 15 and the reception antennas 31 are equal in number, MIMO communication is performed. In other cases, precoding (beam forming) is performed using all the transmission antennas 15 of the selected antenna groups.

Its more detailed operation is the same as the steps S11 through S17 and steps S21 through S31 in FIG. 5, taking the MS 20 as RS 30. Here, in the case of the RS 30, when antenna indexes are transmitted to the BS 10 in step S25 or step S28, indexes of the selected reception antennas 31 are notified to the reception antenna selection controller 37, thereby making the reception antenna selection controller 37 performing connection control between the reception antenna 31 and the RF receiver 33.

In this manner, as to communication between the BS 10 and the RS 30, also, by means of applying antenna selection procedures similar to that of the first embodiment, it is possible to select optimal transmission antennas 15 and reception antennas 31 in accordance with radio environment with high speed with a smaller operation amount than the previous art. In addition, costs and complexity can also be reduced. Further, in accordance with radio environment, MIMO communication or precoding (beam forming) using transmission antennas 15 greater in number than reception antennas is performed selectively. Thus, it is possible to ensure communication quality, such as a transfer amount and a wave reachable range, which can always maintain communication reliability in whatever radio communication environment.

In this instance, as to communication between the RS 30 and the MS 20, by means of applying antenna selection method, taking the BS 10 as the RS 30 in the first embodiment, effects and benefits similar to those of the first embodiment can be obtained.

In addition, according to the present embodiment, when the BS 10 receives signals from the RS 30, or when the RS 30 receives signals from the MS 20, if antenna groups are selected, not using all the reception antennas, performance improvement is realized due to the maximum ratio combination (MRC).

As this invention may be embodied in several forms without departing from the spirit of essential characteristics thereof, the present embodiments are therefore illustrative and not restrictive, since the scope of the invention is defined by the appended claims rather than by the description precoding them, and all changes that fall within metes and bounds of the claims, or equivalence of such metes and bounds thereof are therefore intended to be embraced by the claims.

What is claimed is:

1. A radio communication method for use in a radio communication system in which radio communication is performed between a transmitter having a plurality of transmission antennas and a receiver having a plurality of reception antennas, said method comprising:
   selecting an antenna group which satisfies a first selection criterion relating to communication quality, out of a plurality of antenna groups, each of which is composed of some of the transmission antennas and some of the reception antennas;
   selecting a combination which satisfies a second criterion relating to communication quality, out of combinations of the transmission antennas and the reception antennas which are included in the selected antenna group;
   evaluating whether or not any combination, out of the combinations, exists which satisfies a criterion relating to multiple-input-multiple-output (MIMO) communication in which the number of reception antennas is equal to the number of transmission antennas;
   performing, once it is evaluated that one of the combinations exists which satisfies the criterion, MIMO communication using the one combination of transmission antennas; and
   performing, once it is evaluated that none of the combinations exists which satisfies the criterion, precoding transmission using all of the transmission antennas included in the combinations.

2. A radio communication method as set forth in claim 1, wherein transmission antennas included in the antenna group are multiple adjacent transmission antennas or multiple transmission antennas which are disposed at an equal distance from a reference transmission antenna.

3. A radio communication method as set forth in claim 1, wherein a part of transmission antennas included in an antenna group are included in another antenna group.

4. A radio communication method as set forth in claim 1, wherein the number of transmission antennas included in the antenna group is larger than the number of reception antennas included in the antenna group.

5. A radio communication method as set forth in claim 1, wherein a part of or all of the reception antennas included in an antenna group are included in another antenna group.

6. A radio communication method as set forth in claim 1, wherein the receiver notifies the transmitter of information about the selected combinations of transmission antennas and reception antennas.

7. A radio communication method as set forth in claim 6, wherein at least the receiver notifies the transmitter of information about the number of reception antennas or the number of data streams.

8. A radio communication method as set forth in claim 1, wherein grouping of the antennas is performed on the basis of the number of reception antennas or the number of data streams which can be processed on the receiver.

9. A radio communication method as set forth in claim 1, wherein the transmitter is a base station apparatus, and wherein the receiver is a mobile station apparatus.

10. A radio communication method as set forth in claim 1, wherein the transmitter is a base station apparatus, and wherein the receiver is a relay station apparatus.

11. A radio communication method as set forth in claim 1, wherein the transmitter is a relay station apparatus, and wherein the receiver is a mobile station apparatus.

12. A radio communication method for use in a radio communication system in which radio communication is performed between a transmitter having $N_t$ ($N_t$ is an integer greater than 1) transmission antennas and a receiver having $N_r$ ($N_r$ is and integer greater than 1) reception antennas, said method comprising:

grouping $N_r \times N_t$ channel estimation values, which are obtained between the transmission antennas and the reception antennas, into a plurality of blocks including $L_r \times L_t$ ($L_t < N_t$, $L_r$) element estimation values;

selecting a block which satisfies a first selection criterion relating to communication quality, out of the plurality of blocks;

selecting a combination which satisfies a second criterion relating to communication quality, out of combinations of element estimation values which are included in the selected block;

evaluating whether or not any combination, out of the combinations, exists which satisfies a criterion relating to multiple-input-multiple-output (MIMO) communication in which the number of reception antennas is equal to the number of transmission antennas;

performing, once it is evaluated that one of the combinations exists which satisfies the criterion, MIMO communication using the one combination of transmission antennas; and performing, once it is evaluated that none of the combinations exists which satisfies the criterion, precoding transmission using all of the transmission antennas included in the combinations.

13. A receiver for use in a radio communication system in which radio communication is performed between a transmitter having $N_t$ ($N_t$ is an integer greater than 1) transmission antennas and a receiver having $N_r$ ($N_r$ is an integer greater than 1) reception antennas, said receiver comprising:

a grouping unit that groups $N_r \times N_t$ channel estimation values, which are obtained between the transmission antennas and the reception antennas, into a plurality of blocks including $L_r \times L_t$ ($L_t < N_t$, $L_r \leq N_r$) element estimation values;

a block selecting unit that selects a block that satisfies a first selection criterion relating to communication quality, out of the plurality of blocks obtained by said grouping unit;

an element estimation value selecting unit that selects a combination which satisfies a second criterion relating to communication quality, out of combinations of element estimation values which are included in the block selected by said block selecting unit;

a notifying unit that generates antenna selection information for the transmitter on the basis of selection result obtained by said block selecting unit or said element estimation value selecting unit and notifies the transmitter of the generated antenna selection information, wherein said element estimation value selecting unit includes an evaluating unit that evaluates whether or not any combination, out of the combinations of the element estimation values, exists which satisfies a criterion relating to multiple-input-multiple-output (MIMO) communication in which the number of reception antennas is equal to the number of transmission antennas, and wherein said notifying unit includes an antenna selection information generating unit that generates, once it is evaluated by said evaluating unit that one of the combinations exists which satisfies the criterion, the antenna selection information corresponding to the one combination and which generates, once it is evaluated by said evaluating unit that none of the combinations exits that satisfies the criterion, precoding information, necessary for precoding transmission by said transmitter, as the antenna selection information on the basis of the combinations of element estimation values and notifies the transmitter of the antenna selection information.

14. A receiver as set forth in claim 13, wherein the block includes multiple adjacent element estimation values or multiple element estimation values disposed at an equal distance from a reference element estimation value in an $N_r \times N_t$ channel matrix.

15. A receiver as set forth in claim 13, wherein a part of element estimation values included in a block are included in another block.

16. A receiver as set forth in claim 13, wherein $L_t > L_r$.

17. A transmitter for use in a radio communication system in which radio communication is performed between the transmitter having $N_t$ ($N_t$ is an integer greater than 1) transmission antennas and a receiver having Nr (Nr is an integer greater than 1) reception antennas, the receiver is configured to (i) select a block that satisfies a first selection criterion relating to communication quality, out of a plurality of blocks which are obtained by means of grouping $N_r \times N_t$ channel estimation values, which are obtained between the transmission antennas and the reception antennas, into a plurality of blocks including $L_r \times L_t$ (Lt<$N_t$, $L_{r \leq Nr}$) element estimation values, and (ii) select a combination which satisfies a second criterion relating to communication quality, out of combinations of element estimation values which are included in the selected block, and (iii) evaluate whether or not any combination, out of the combinations of the element estimation values, exists which satisfies a criterion relating to multiple-input-multiple-output (MIMO) communication in which the number of reception antennas is equal to the number of transmission antennas, and (iv) generate, once it is evaluated that one of the combinations exists which satisfies the criterion, the antenna selection information corresponding to the one combination and which generates, once it is evaluated none of the combinations exists which satisfies the criterion, precoding information that such a combination does not exist, precoding information, necessary for precoding transmission by said transmitter, as the antenna selection information on the basis of the combinations of element estimation values, and (iv) notifies the transmitter of the generated antenna selection information, said transmitter comprising:

a receiving unit that receives the antenna selection information notified by the receiver; and an antenna selecting unit that selects transmission antenna to be used according to the antenna selection information received by said receiving unit.

18. A transmitter as set forth in claim 17, further comprising a precoding unit that performs, when precoding information is received by said receiving unit as the antenna selection information, precoding transmission using transmission antennas corresponding to the combination of element estimation values, on the basis of the received precoding information.

* * * * *